US012214615B2

(12) United States Patent
Liu

(10) Patent No.: US 12,214,615 B2
(45) Date of Patent: Feb. 4, 2025

(54) LOOSE-LEAF NOTEBOOK AND BINDING STRUCTURE THEREOF

(71) Applicant: Shandong Vikko Paper Co., Ltd, Liaocheng (CN)

(72) Inventor: Xingxing Liu, Liaocheng (CN)

(73) Assignee: Shandong Vikko Paper Co., Ltd, Liaocheng (CN)

( * ) Notice: Subject to any disclaimer, the term of this patent is extended or adjusted under 35 U.S.C. 154(b) by 0 days.

(21) Appl. No.: 18/636,315

(22) Filed: Apr. 16, 2024

(65) Prior Publication Data

US 2024/0278593 A1 Aug. 22, 2024

Related U.S. Application Data

(63) Continuation of application No. PCT/CN2022/114476, filed on Aug. 24, 2022.

(30) Foreign Application Priority Data

Oct. 29, 2021 (CN) ......................... 202122636194.2
Feb. 10, 2022 (CN) ......................... 202220274571.4

(51) Int. Cl.
*B42F 3/04* (2006.01)
*B42B 5/00* (2006.01)

(52) U.S. Cl.
CPC .................................... *B42F 3/04* (2013.01)

(58) Field of Classification Search
CPC .................................... B42F 3/04; B42B 5/00
USPC ... 402/7, 8, 17, 18, 19, 22, 24, 68, 500, 501
See application file for complete search history.

(56) References Cited

U.S. PATENT DOCUMENTS

2003/0161677 A1* 8/2003 Drew ..................... B42F 13/10
402/8

* cited by examiner

*Primary Examiner* — Justin V Lewis

(57) ABSTRACT

A loose-leaf notebook and its binding structure are provided. The binding structure includes a base plate. The base plate is provided with binding strips and snapping holes corresponding to the binding strips. A bottom end of each of the binding strips is fixed on the base plate, and a top end of each of the binding strips is inserted into a corresponding snapping hole. Due to the elasticity of the material itself, hands will not be hurt during writing, and loose-leaf papers can be easily flipped. If a user needs to remove or change an order of the loose-leaf papers, the user can remove the binding strips from the snapping holes to easily change papers and perform rebinding. The binding structure can also be reused by replacing the loose-leaf papers of the loose-leaf notebook.

14 Claims, 6 Drawing Sheets

LOOSE-LEAF NOTEBOOK AND BINDING STRUCTURE THEREOF

CROSS-REFERENCE TO RELATED APPLICATIONS

This application is a continuation of International Patent Application No. PCT/CN2022/114476, filed Aug. 24, 2022, which claims the priority of Chinese Patent Application No. 202220274571.4, filed Feb. 10, 2022, and the priority of Chinese Patent Application No. 202122636194.2, filed Oct. 29, 2021, all of which are herein incorporated by reference in their entirety.

TECHNICAL FIELD

The present disclosure belongs to the field of loose-leaf binding technologies, in particular to a loose-leaf notebook and its binding structure.

BACKGROUND

The loose-leaf notebook in the related art is bound by a stainless steel ring, an electroplated iron wire, or a plastic-coated iron wire. These binding structures are not only not environmentally friendly in recycling, but also cannot be reused. The most important thing is that these binding structures can cause discomfort to the hand of a user when the user writes on a reverse side of a paper of a notebook, thus the reverse side of the paper cannot be fully utilized for writing. At present, there are many kinds of products, but they do not solve the problem of hand discomfort, resulting in the inability to write on the reverse side of the paper or the unwillingness of students to write on the reverse side of the paper, which leads to a great waste in the use of notebooks.

SUMMARY

A purpose of the present disclosure is to overcome shortcomings of the related art, and the present disclosure provides an environment-friendly, comfortable and reusable loose-leaf notebook and its binding structure. The binding structure of the loose-leaf notebook provided by the present disclosure can be reused, and the problems of hand discomfort and inconvenience caused by writing on the reverse side of the paper of the loose-leaf notebook are solved.

To achieve the above purpose, the present disclosure provides the following technical solutions.

The present disclosure provides a binding structure for a loose-leaf notebook. The binding structure includes multiple binding strips, a base plate configured to support the loose-leaf notebook, and multiple snapping blocks. The multiple binding strips are disposed on the base plate. The base plate defines multiple snapping holes in one-to-one correspondence with the multiple binding strips. A bottom end of each binding strip is fixed to the base plate, and a top end of each binding strip is snapped into the corresponding snapping hole after each binding strip is bent to pass through the loose-leaf notebook. The multiple snapping blocks are disposed on the top ends of the multiple binding strips and configured to be snapped into the multiple snapping holes, thereby ensuring that the binding strips are firmly fixed in the snapping holes and are not easily removed or detached. The base plate, the multiple binding strips, and the multiple snapping blocks are all made of silicone rubber, and therefore the binding structure has the characteristics of softness, durability, and reusability. By using the above technical solution, the binding structure can solve the problems of environmental unfriendliness, discomfort, and inconvenience in existing loose-leaf notebooks; and the binding structure allows users to write notes, practice, and other contents on reverse sides of papers without the concern of hand discomfort, thereby improving the use efficiency of loose-leaf notebooks.

In an embodiment, the base plate, the multiple binding strips, and the multiple snapping blocks are integrated into an inseparable single-piece structure. This design can improve the overall strength and stability of the binding structure, reduce seams and joints between parts, and improve the service life and reliability of the binding structure. At the same time, the inseparable single-piece structure (i.e., the binding structure) can also simplify a production process, improve production efficiency and reduce production costs.

In an embodiment, the top end of each binding strip is provided with two of the multiple snapping blocks thereon, and the two snapping blocks provided on each binding strip are arranged along a lengthwise direction of the binding strip and spaced from each other. After each binding strip is snapped into the corresponding snapping hole, the two snapping blocks provided on each binding strip are disposed on two sides of the base plate along a thicknesswise direction of the base plate, respectively. This design ensures a stable and tight connection between the top ends of the multiple binding strips and the base plate, and ensures that positions of the multiple snapping blocks are relatively fixed; and the design makes the multiple snapping blocks less prone to displacement or loosening, thereby providing a better binding effect. In this way, the multiple binding strips can be firmly fixed on the base plate without falling off or deforming due to external forces, which helps to improve the service life and stability of the binding structure.

In an embodiment, a back surface of the base plate facing away from the multiple binding strips has a beveled surface where the base plate thins in a thicknesswise direction of the base plate and extends outwards (i.e., the beveled surface is formed by thinning the base plate in the thicknesswise direction of the base plate and extending outsides). In this design, the beveled surface is formed on the back surface of the base plate where the base plate thins outward in a direction facing towards the loose-leaf notebook, so that when the loose-leaf notebook is placed on the base plate, a height increment of the loose-leaf notebook caused by the based plate can be reduced as much as possible. Therefore, the loose-leaf notebook tends to be in a horizontal state, writing experience is effectively improved, and a user can write more stably and comfortably. At the same time, the height increment of the loose-leaf notebook caused by the base plate is reduced to reduce the jitter and shake during writing, and the writing precision and accuracy are improved.

In an embodiment, a side of a thicknesswise direction of the base plate defines multiple trapezoidal grooves, and each trapezoidal groove inclines inwards to a corresponding one of the multiple snapping holes; or two sides of the thicknesswise direction of the base plate define multiple trapezoidal grooves, and each trapezoidal groove inclines inwards to a corresponding one of the snapping holes. This design can provide a certain insertion angle or a certain pull angle for the snapping holes, which reduces resistance and friction during insertion or pulling, which makes it easier for the binding strip to be inserted into the corresponding snapping hole or pulled out from the corresponding snapping hole. In this way, it is more convenient and smoother for the user to perform binding operations.

The present disclosure further provides a binding structure for a loose-leaf notebook. The binding structure includes:

- a base plate including a first surface and a second surface opposite to the first surface;
- multiple snapping holes, arranged along a lengthwise direction of the base plate and penetrating through the first surface and the second surface; and
- multiple flexible binding strips, arranged along the lengthwise direction of the base plate and corresponding to the multiple snapping holes one by one; where each flexible binding strip includes a bottom end and a top end opposite to each other, the bottom end of each flexible binding strip is fixed on the first surface of the base plate, and the top end of each flexible binding strip is a free end;
- where after each flexible binding strip bends and passes through the loose-leaf notebook, the top end of each flexible binding strip is snapped into the corresponding snapping hole along a direction from the second surface towards the first surface to form a snap fit with the base plate; and after forming the snap fit, the top end and the bottom end of each flexible binding strip are spaced from each other in a widthwise direction of the base plate.

In an embodiment, the top end of each flexible binding strip is provided with a snapping block; and after forming the snap fit, the snapping block protrudes from the first surface of the base plate. By designing the snapping blocks, it is ensured that the multiple flexible binding strips are firmly fixed in the multiple snapping holes of the base plate and are not easily removed or detached.

In an embodiment, the top end of each flexible binding strip is provided with two snapping blocks. The two snapping blocks provided on the top end of each flexible binding strip are arranged along a lengthwise direction of the binding strip and spaced from each other. After forming the snap fit, the two snapping blocks provided on the top end of each flexible binding strip are disposed on two sides of the base plate along a thicknesswise direction of the base plate, respectively. Compared with a single snapping block arranged at the top end of each flexible binding strip, the two snapping blocks are disposed vertically and spaced from each other, so that better support and stability can be provided, better embedding and connection between the binding strip and the base plate can be realized, a firmer binding force can be provided, and the multiple flexible binding strips can be effectively prevented from shaking or loosening in use.

In an embodiment, after forming the snap fit, an outer one of the two snapping blocks provided on the top end of each flexible binding strip protrudes from the first surface of the base plate, and an inner one of the two snapping blocks is embedded in the second surface of the base plate. By setting the outer one of the two snapping blocks onto the first surface, it is convenient for the snapping block to be inserted or pulled out at the corresponding snapping hole of the base plate. By embedding the inner one of the two snapping blocks on the second surface, the second surface that fits with a loose-leaf paper of the loose-leaf notebook can be kept flat, making it easy to write.

In an embodiment, the second surface of the base plate defines multiple recessed grooves respectively facing the multiple snapping holes, and the inner one of the two snapping blocks provided on the top end of each flexible binding strip is embedded in a corresponding one of the multiple recessed grooves. This design allows the inner one of the two snapping blocks to be recessed in the corresponding recessed groove, so that the corresponding flexible binding strip is bent and inserted into the base plate, and the second surface will not have protrusions caused by the inner snapping block. The design can ensure that the second surface is flat and easy to fit with the loose-leaf paper for easy writing.

The present disclosure further provides a loose-leaf notebook. The loose-leaf notebook includes multiple loose-leaf papers and a binding structure. The binding structure is a single-piece structure (in other words, the binding structure is integrally formed).

The binding structure includes:

- a base plate including a first surface and a second surface opposite to the first surface;
- multiple snapping holes, arranged along a lengthwise direction of the base plate and penetrating through the first surface and the second surface; and
- multiple binding strips, arranged along the lengthwise direction of the base plate and corresponding to the multiple snapping holes one by one; where each binding strip includes a bottom end and a top end opposite to each other, the bottom end of each binding strip is disposed on the first surface of the base plate;
- where after each binding strip bends along a direction facing away from the corresponding snapping hole and passes through the multiple loose-leaf papers, the top end of each binding strip is snapped into the corresponding snapping hole along a direction from the second surface towards the first surface to form a snap fit with the base plate; and after forming the snap fit, the top end and the bottom end of each binding strip are spaced from each other in a widthwise direction of the base plate.

Compared with the related art, the present disclosure has the following beneficial effects.

1. The binding structure ensures the stability and durability of the binding structure based on good elasticity and compression resistance provided by the silicone rubber. The binding structure can allow the loose-leaf papers be flipped for multiple times, and is not easy to damage and deform, thereby improving the service life of the loose-leaf notebook. The binding structure made of silicone rubber is smooth and soft, does not hurt hands, can provide a more comfortable writing experience, can write on the reverse side of each loose-leaf paper of the loose-leaf notebook, and makes full use of two sides of each loose-leaf paper of the loose-leaf notebook, so that a user does not feel uncomfortable or painful when writing and can write more smoothly.

2. According to bending properties and durability provided by the binding structure made of silicone rubber, the loose-leaf notebook can be rolled up and put into a backpack or a pocket, so that the loose-leaf notebook is convenient to carry, and the service life of the loose-leaf notebook is longer; and the binding structure made of silicone rubber is degradable and environment-friendly, so that the consumption of resources can be reduced, the influence on the environment is reduced, and the concept of sustainable development is met.

3. When the binding structure needs to remove or change an order of papers, the binding strips can be removed from the snapping holes (i.e., the snapping holes can be opened) to easily complete page change and re-binding. The binding structure can also be reused by replacing the loose-leaf papers of the loose-leaf notebook after writing.

4. Compared with a single snapping block arranged at a top end of each binding strip, in the binding structure of the present disclosure, two snapping blocks are disposed vertically and spaced from each other, so that better support and stability can be provided, better embedding and connection between the binding strips and the base plate can be realized, firmer binding force can be provided, and the multiple flexible binding strips can be effectively prevented from shaking or loosening in use.

Other advantages, purposes, and features of the present disclosure will be described in the subsequent content of the specification. Generally, they are apparent to those skilled in the art based on the specification or can be taught from embodiments of the present disclosure. The purposes and other advantages of the present disclosure can be achieved and obtained through the following description.

BRIEF DESCRIPTION OF DRAWINGS

In order to make the purposes, technical solutions, and advantages of the present disclosure clearer, the present disclosure will be described in detail with reference to the following drawings.

DESCRIPTION OF REFERENCE NUMERALS

1—snapping hole; 2—binding strip; 3—base plate; 4—snapping block; 5—beveled surface; 6—trapezoidal groove; 7—recessed groove; 8—loose-leaf paper; 21—bottom end; 22—top end; 31—first surface; 32—second surface.

DETAILED DESCRIPTION OF EMBODIMENTS

The following description provides a further detailed explanation of the technical features of the present disclosure in conjunction with the drawings, thereby facilitating those skilled in the art understanding the present disclosure.

Figure 1:
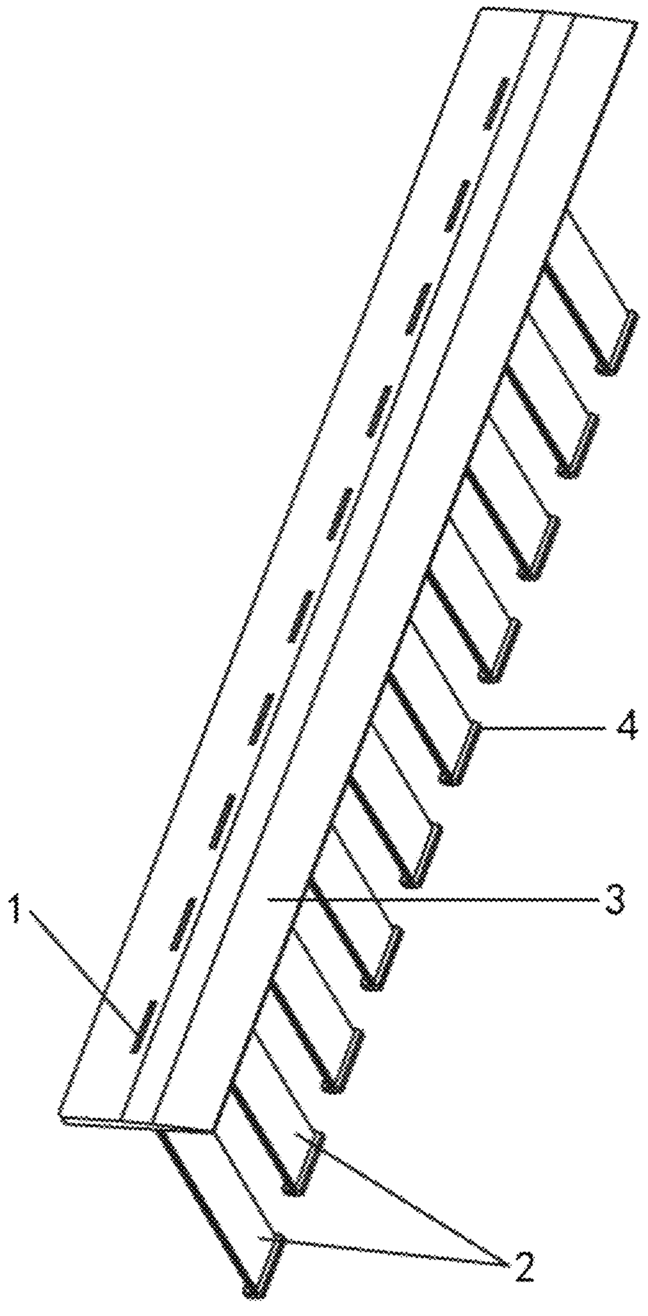
FIG. 1 illustrates a perspective view of a binding structure in a first embodiment of the disclosure.
Figure 2:
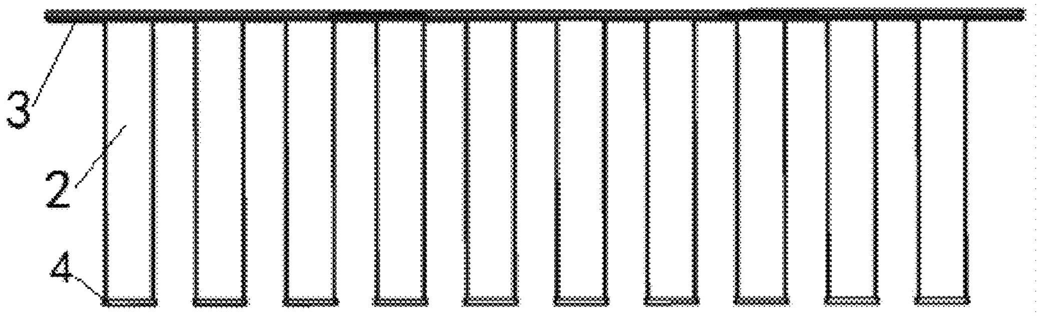
FIG. 2 illustrates a side view of the binding structure illustrated in FIG. 1.
Figure 3:
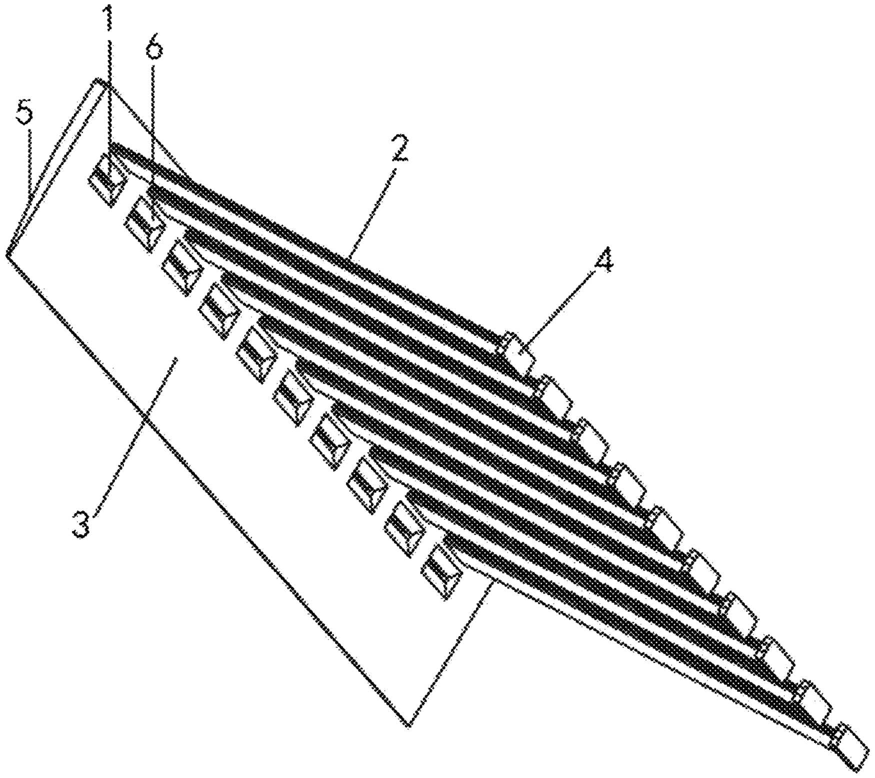
FIG. 3 illustrates another perspective view of the binding structure illustrated in FIG. 1.

Referring to FIG. 1 to FIG. 3, the present disclosure provides a binding structure for a loose-leaf notebook in a first embodiment. The binding structure includes multiple binding strips 2, a base plate 3, and multiple snapping blocks 4. The multiple binding strips 2 are disposed on the base plate 3. The base plate 3 defines multiple snapping holes 1 in one-to-one correspondence with the multiple binding strips 2. A bottom end 21 of each binding strip 2 is fixed to the base plate 3. A top end 22 of each binding strip 2 is snapped into the corresponding snapping hole 1. The multiple snapping blocks 4 are disposed on the top ends 22 of the multiple binding strips 2. The multiple snapping blocks 4 are configured to be snapped into the multiple snapping holes 1. Preferably, the base plate 3, the multiple binding strips 2, and the multiple snapping blocks 4 are all made of silicone rubber.

In the above scheme, the multiple snapping blocks 4 on the top ends 22 of the multiple binding strip 2 are snapped in the base plate 3 to form a circular structure for binding the loose-leaf notebook. Specifically, each binding strip 2 is bent in a direction facing away from the corresponding snapping hole 1, then each binding strip 2 passes through the loose-leaf notebook and is connected to the corresponding snapping hole 1 of the base plate 3. The loose-leaf notebook is fixed using a tensile force of the silicone rubber material itself. The amount of the binding strips 2, a length of the binding structure, and a size of the binding structure can be adjusted according to a size of the loose-leaf notebook. Furthermore, the binding structure is made of the silicone rubber, which can ensure the stability and durability of the binding structure based on good elasticity and compression resistance provided by the silicone rubber. The binding structure can withstand the loose-leaf papers be flipped multiple times, and is not easy to damage and deform, thereby improving the service life of the loose-leaf notebook. The binding structure made of the silicone rubber is smooth and soft, does not hurt hands, can provide a more comfortable writing experience, can write on the reverse side of each loose-leaf paper of the loose-leaf notebook, and makes full use of two sides of each loose-leaf paper of the loose-leaf notebook, so that a user does not feel uncomfortable or painful when writing and can write more smoothly.

In the first embodiment, the base plate 3, the multiple binding strips 2, and the multiple snapping blocks 4 are integrated into an inseparable single-piece structure. On the one hand, this design can improve the overall strength and stability of the binding structure, and on the other hand, the design can simplify a production process of the binding structure, improve production efficiency, and reduce production costs.

In the first embodiment, a back surface of the base plate 3 facing away from the multiple binding strips 2 has a beveled surface 5, the beveled surface 5 is formed by the base plate 3 being thinned in a thicknesswise direction of the base plate 3 and extends outwards. The beveled surface 5 can reduce a height increment of the loose-leaf notebook caused by the base plate 3, so that the jitter and shake during writing can be reduced, and the writing precision and accuracy are improved.

Figure 4:
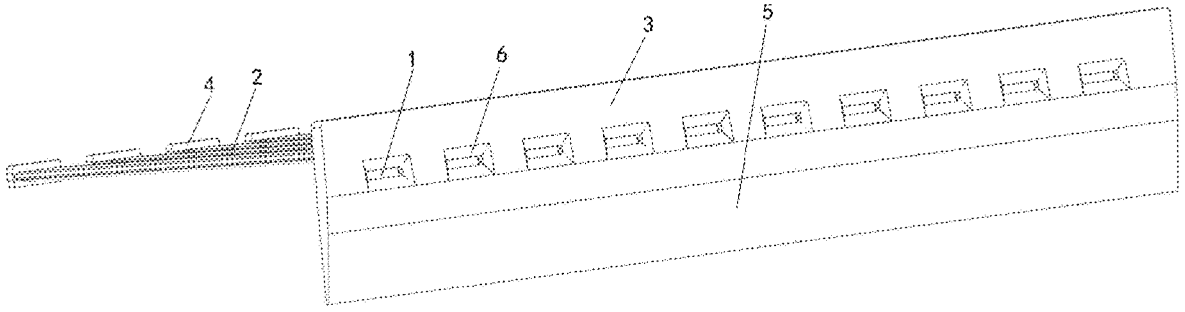
FIG. 4 illustrates a structural view of a binding structure in a second embodiment of the disclosure.

Referring to FIG. 4, in a second embodiment, two sides of a thicknesswise direction of the base plate 3 define multiple trapezoidal grooves 6, and each trapezoidal groove 6 inclines inwards to a corresponding one of the multiple snapping holes 1. This design can provide a certain insertion angle or a certain pull angle for the snapping holes 1, which reduces resistance and friction during insertion or pulling, which makes it easier for the binding strip 2 to be inserted into the corresponding snapping hole 1 or pulled out from the corresponding snapping hole 1. In this way, it is more convenient and smoother for the user to perform binding operations. In other embodiments, based on a combination of FIG. 1 and FIG. 3, it is also practicable to define the trapezoidal grooves 6 only on a side of the thicknesswise direction of the base plate 3.

Figure 5:
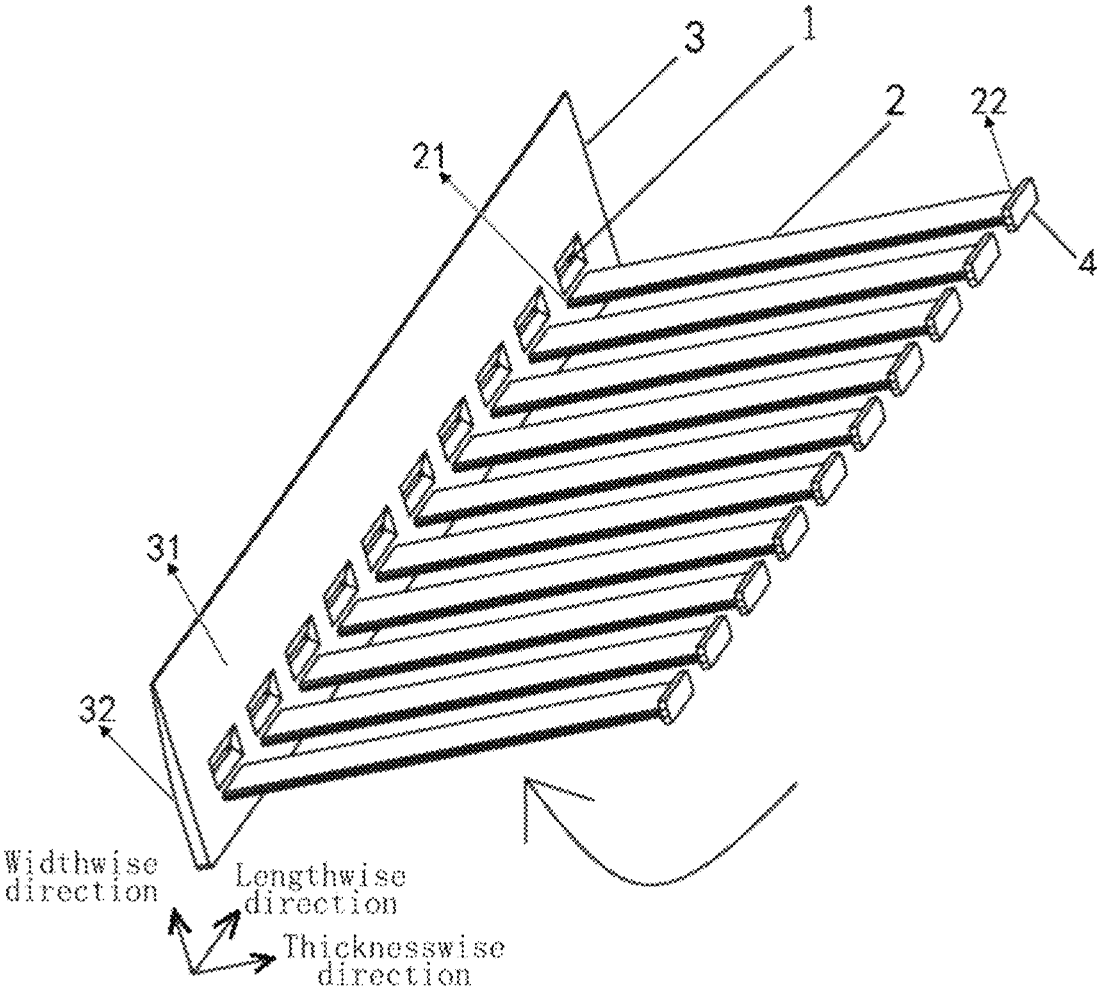
FIG. 5 illustrates another perspective view of the binding structure illustrated in FIG. 1; and an arrow in FIG. 5 indicates a bending direction of binding strips.

Referring to FIG. 5, a binding structure for the loose-leaf notebook includes:

- a base plate 3 including a first surface 31 and a second surface 32 opposite to the first surface 31;
- multiple snapping holes 1, arranged along a lengthwise direction of the base plate 3 and penetrating through the first surface 31 and the second surface 32; and
- multiple flexible binding strips 2, arranged along the lengthwise direction of the base plate 3 and corresponding to the multiple snapping holes 1 one by one.

Each flexible binding strip 2 includes a bottom end 21 and a top end 22 opposite to each other. The bottom end 21 of each flexible binding strip 2 is fixed on the first surface 31 of the base plate 3. The top end 22 of each flexible binding strip 2 is a free end. After each flexible binding strip 2 bends and passes through the loose-leaf notebook, the top end 22 of each flexible binding strip 2 is snapped into the corresponding snapping hole 1 along a direction from the second surface 32 towards the first surface 31 to form a snap fit with the base plate 3. After forming the snap fit, the top end 22 and the bottom end 21 of each flexible binding strip 2 are spaced from each other in a widthwise direction of the base plate 3.

In the binding structure of the embodiment, the top end 22 of each flexible binding strip 2 is provided with a snapping block 4. After forming the snap fit, the snapping block 4 protrudes from the first surface 31 of the base plate 3. By designing the snapping blocks 4, it is ensured that the multiple flexible binding strips 2 are firmly fixed in the multiple snapping holes 1 of the base plate 3 and are not easily removed or detached.

Figure 6:
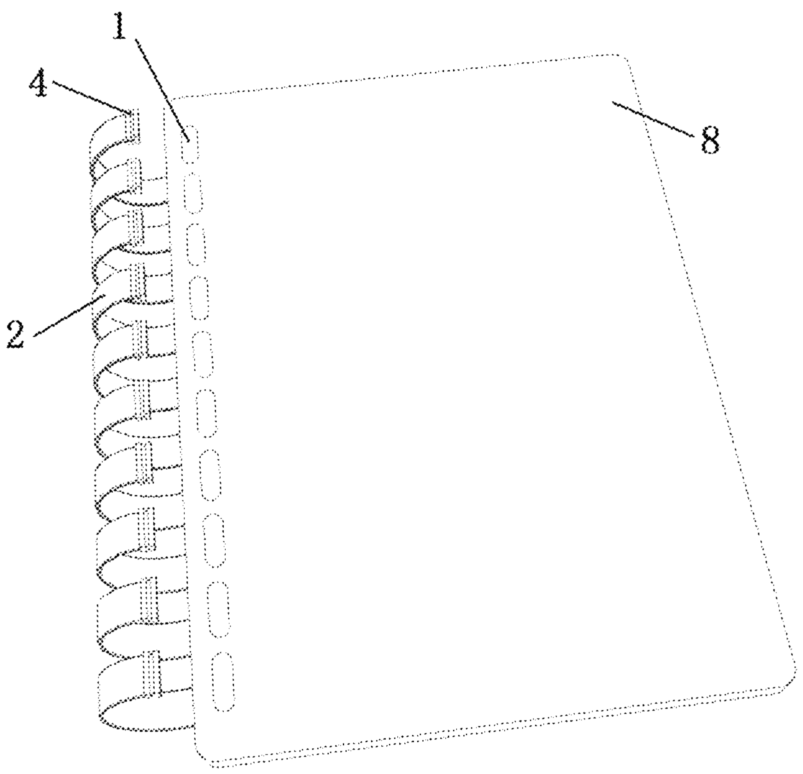
FIG. 6 illustrates a front view of a binding structure of the present disclosure before binding.
Figure 7:
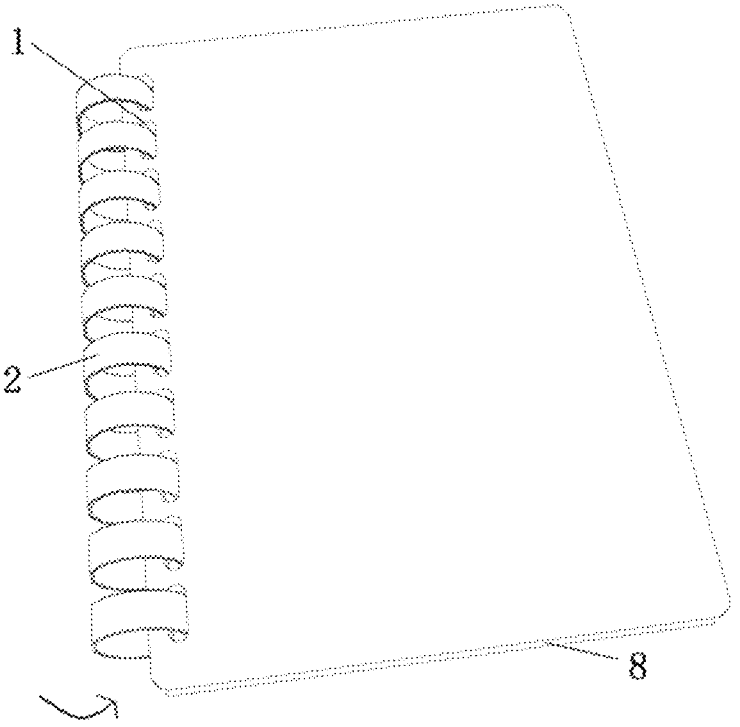
FIG. 7 illustrates a front view of a binding structure of the present disclosure after binding.
Figure 8:
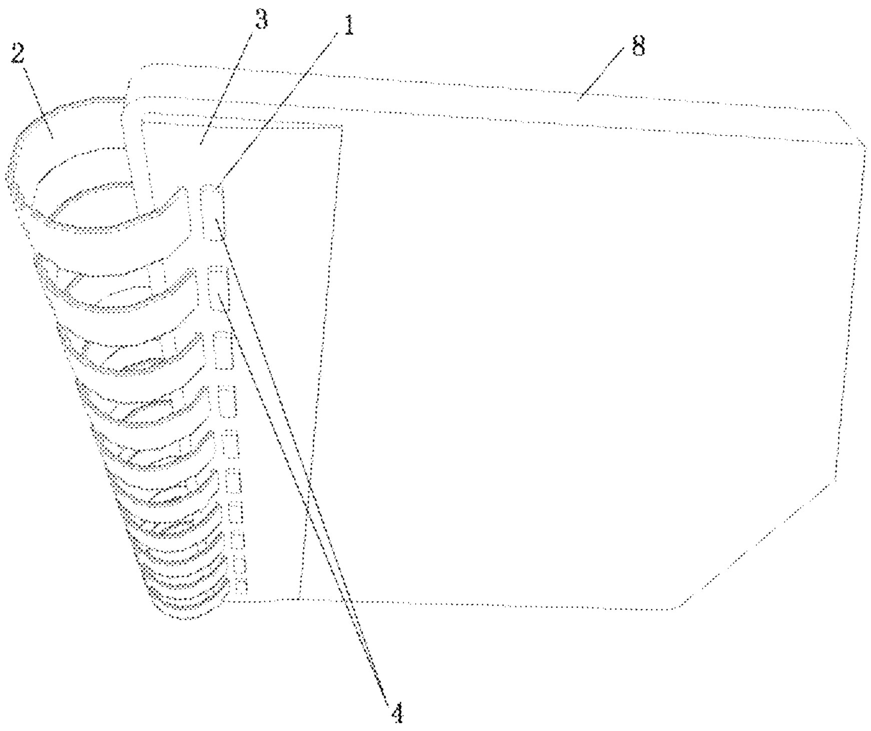
FIG. 8 illustrates a back view of a binding structure of the present disclosure after binding.

As shown in FIG. 6 to FIG. 8, a loose-leaf notebook of the present disclosure includes multiple loose-leaf papers 8 and a binding structure. The binding structure is a single-piece structure. The binding structure includes:

- a base plate 3 including a first surface 31 and a second surface 32 opposite to the first surface 31;
- multiple snapping holes 1, arranged along a lengthwise direction of the base plate 3 and penetrating through the first surface 31 and the second surface 32; and
- multiple binding strips 2, arranged along the lengthwise direction of the base plate 3 and corresponding to the multiple snapping holes 1 one by one.

Each binding strip 2 includes a bottom end 21 and a top end 22 opposite to each other. The bottom end 21 of each binding strip 2 is disposed on the first surface 31 of the base plate 3. After each binding strip 2 bends along a direction facing away from the corresponding snapping hole 1 to pass through the multiple loose-leaf papers 8, the top end 22 of each binding strip 2 is snapped into the corresponding snapping hole 1 along a direction from the second surface 32 towards the first surface 31 to form a snap fit with the base plate 3. After forming the snap fit, the top end 22 and the bottom end 21 of each binding strip 2 are spaced from each other in a widthwise direction of the base plate 3. The base plate 3, the multiple binding strips 2, and the multiple snapping blocks 4 are all made of silicone rubber. In this way, the multiple snapping blocks 4 are snapped on the base plate 3 by bending the binding strips 2, and a tensile force of the silicone rubber itself can be used to form a circular structure to bind the loose-leaf papers 8 to form the loose-leaf notebook. When the loose-leaf notebook needs to remove or change an order of the loose-leaf papers 8, the binding strips 2 can be removed from the multiple snapping holes 1 to easily complete page change and re-binding. The binding structure can also be reused by replacing the loose-leaf papers 8 of the loose-leaf notebook after writing.

Figure 9:
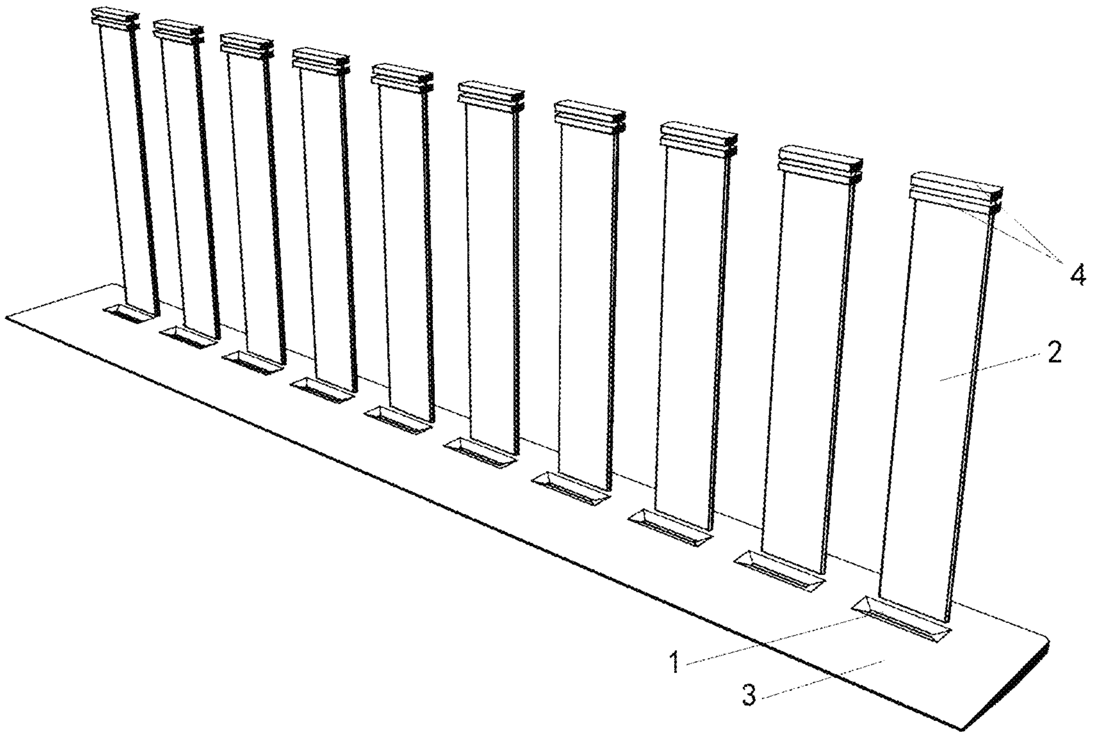
FIG. 9 illustrates a perspective view of a binding structure in a third embodiment of the disclosure.
Figure 10:
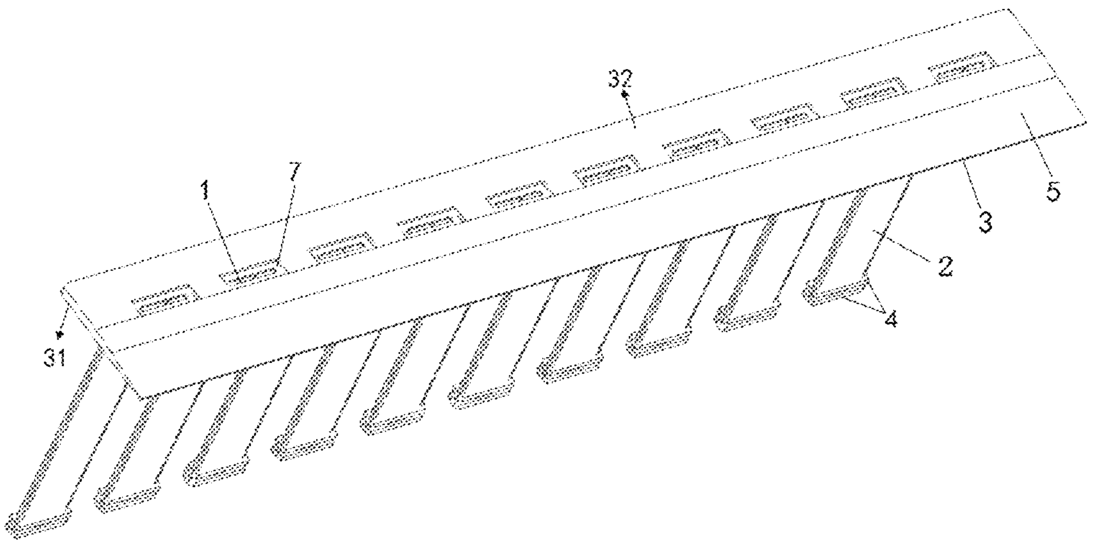
FIG. 10 illustrates another perspective view of the binding structure illustrated in FIG. 9.

Referring to FIG. 9 and FIG. 10, in a third embodiment, each binding strip 2 is provided with two snapping blocks 4. The two snapping blocks 4 provided on the top end 22 of each binding strip 2 are arranged along a lengthwise direction of the binding strip 2 and spaced from each other. After forming the snap fit, the two snapping blocks 4 provided on each binding strip 2 are disposed on two sides of the base plate 3 along a thicknesswise direction of the base plate 3, respectively. The spacing between the two snapping blocks 4 disposed vertically is used to clamp the base plate 3, which can ensure a stable and tight connection between the top end 22 of the binding strip 2 and the base plate 3, make positions of the snapping blocks 4 relatively fixed, make the snapping blocks 4 not prone to displacement or loosening, and can provide a better binding effect. Compared with a single snapping block arranged at the top end 22 of each flexible binding strip 2, the two snapping blocks 3 are disposed vertically and spaced from each other, so that better support and stability can be provided, better embedding and connection between the flexible binding strip 2 and the base plate 3 can be realized, a firmer binding force can be provided, and the multiple flexible binding strips 2 can be effectively prevented from shaking or loosening in use. At the same time, after forming the snap fit, an outer one of the two snapping blocks 4 protrudes on the first surface 31 of the base plate 3, and an inner one of the two snapping blocks 4 is embedded in the second surface 32 of the base plate 3. By setting the outer one of the two snapping blocks 4 onto the first surface 31, it is convenient for the snapping block 4 to be inserted into or pulled out from the corresponding snapping hole 1 of the base plate 3. By embedding the inner one of the two snapping blocks 4 on the second surface 32, the second surface 32 that fits with a loose-leaf paper 8 of the loose-leaf notebook can be kept flat, making it easy to write.

In the embodiment, the base plate 3 forms a beveled surface 5 on the second surface 32 where the base plate 3 thins in a thicknesswise direction of the base plate 3 and extends outwards. The beveled surface 5 can reduce a height increment of the loose-leaf notebook caused by the base plate 3 to reduce the jitter and shake during writing, thereby improving precision and accuracy of writing. The second surface 32 of the base plate 3 along the thicknesswise direction of the base plate 3 define trapezoidal grooves 6, and each of the trapezoidal grooves 6 inclines inwards to a corresponding one of the snapping holes 1. These trapezoidal grooves 6 can reduce resistance and friction during insertion or pulling, which makes it easier for each of the flexible binding strips 2 to be inserted into the corresponding snapping hole 1 or pulled out from the corresponding snapping hole 1. In this way, it is more convenient and smoother for the user to perform binding operations. The second surface 32 of the base plate 3 defines multiple recessed grooves 7 respectively facing the multiple snapping holes 1, and the inner one of the two snapping blocks 4 is embedded in a corresponding one of the multiple recessed grooves 7. The multiple recessed grooves 7 allow the inner one of the two snapping blocks 4 to be recessed in a corresponding one of the multiple recessed grooves 7, so that a corresponding flexible binding strip 2 can be bent and inserted into the base plate 3, and the second surface 32 will not have protrusions caused by the inner snapping block 4. The multiple recessed grooves 7 can ensure that the second surface 32 is flat and easy to fit with the loose-leaf paper 8 for easy writing.

Finally, it should be noted that the above embodiments are only used to illustrate the technical solutions of the present disclosure and not to limit the present disclosure. Although the present disclosure has been described in detail with reference to preferred embodiments, those skilled in the art should understand that the technical solutions of the present disclosure can be modified or equivalently replaced without departing from the purpose and scope of the present technical solutions, and these modifications and equivalent replacements should be included in the scope of the claims of the present disclosure.

What is claimed is:

1. A binding structure for a loose-leaf notebook, comprising: a plurality of binding strips (2), a base plate (3), and a plurality of snapping blocks (4); wherein the plurality of binding strips (2) are disposed on the base plate (3); the base plate (3) defines a plurality of snapping holes (1) in one-to-one correspondence with the plurality of binding strips (2); a bottom end (21) of each binding strip (2) is fixed to the base plate (3), and a top end (22) of each binding strip (2) is snapped into the corresponding snapping hole (1) after each binding strip (2) is bent to pass through the loose-leaf notebook; the plurality of snapping blocks (4) are disposed on the top ends (22) of the plurality of binding strips (2) and configured to be snapped into the plurality of snapping holes (1); and the base plate (3), the plurality of binding strips (2), and the plurality of snapping blocks (4) are made of silicone rubber; and wherein the top end (22) of each binding strip (2) is provided with two of the plurality of snapping blocks (4) thereon, and the two snapping blocks (4) provided on each binding strip (2) are arranged along a length of the binding strip (2) and spaced from each other; after each binding strip (2) is snapped into the corresponding snapping hole (1), the two snapping blocks (4) provided on each binding strip (2) are disposed on two sides of the base plate (3) along a thickness of the base plate (3), respectively.

2. The binding structure for the loose-leaf notebook as claimed in claim 1, wherein the base plate (3), the plurality of binding strips (2), and the plurality of snapping blocks (4) are integrated into an inseparable single-piece structure.

3. The binding structure for the loose-leaf notebook as claimed in claim 1, wherein a back surface of the base plate (3) facing away from the plurality of binding strips (2) has a beveled surface (5).

4. The binding structure for the loose-leaf notebook as claimed in claim 1, wherein a side of the thickness of the base plate (3) defines a plurality of trapezoidal grooves (6), and each trapezoidal groove (6) inclines inwards to a corresponding one of the plurality of snapping holes (1); or two sides of the thickness of the base plate (3) define a plurality of trapezoidal grooves (6), and each trapezoidal groove (6) inclines inwards to a corresponding one of the snapping holes (1).

5. A binding structure for a loose-leaf notebook, comprising:

a base plate (3) comprising a first surface (31) and a second surface (32) opposite to the first surface (31);

a plurality of snapping holes (1), arranged along a length of the base plate (3) and penetrating through the first surface (31) and the second surface (32); and a plurality of flexible binding strips (2), arranged along the length of the base plate (3) and corresponding to the plurality of snapping holes (1) one by one; wherein each flexible binding strip (2) comprises a bottom end (21) and a top end (22) opposite to each other, the bottom end (21) of each flexible binding strip (2) is fixed on the first surface (31) of the base plate (3), and the top end (22) of each flexible binding strip (2) is a free end;

wherein after each flexible binding strip (2) bends and passes through the loose-leaf notebook, the top end (22) of each flexible binding strip (2) is snapped into the corresponding snapping hole (1) along a direction from the second surface (32) towards the first surface (31) to form a snap fit with the base plate (3); and after forming the snap fit, the top end (22) and the bottom end (21) of each flexible binding strip (2) are spaced from each other in a width of the base plate (3);

where the first surface (31) of the base plate (3) defines a plurality of trapezoidal grooves (6), and each trapezoidal groove (6) inclines inwards to a corresponding one of the plurality of snapping holes (1).

6. The binding structure for the loose-leaf notebook as claimed in claim 5, wherein the top end (22) of each flexible binding strip (2) is provided with a snapping block (4); and after forming the snap fit, the snapping block (4) protrudes from the first surface (31) of the base plate (3).

7. The binding structure for the loose-leaf notebook as claimed in claim 6, wherein the base plate (3), the plurality of flexible binding strips (2), and the plurality of snapping blocks (4) provided on the plurality of flexible binding strips (2) are integrated into a single-piece structure; and the base plate (3), the plurality of flexible binding strips (2), and the plurality of snapping blocks (4) are made of silicone rubber.

8. The binding structure for the loose-leaf notebook as claimed in claim 5, wherein the top end (22) of each flexible binding strip (2) is provided with two snapping blocks (4); the two snapping blocks (4) provided on the top end (22) of each flexible binding strip (2) are arranged along a length of the binding strip (2) and spaced from each other; after forming the snap fit, the two snapping blocks (4) provided on the top end (22) of each flexible binding strip (2) are disposed on two sides of the base plate (3) along a thickness of the base plate (3), respectively.

9. The binding structure for the loose-leaf notebook as claimed in claim 8, wherein after forming the snap fit, an outer one of the two snapping blocks (4) provided on the top end (22) of each flexible binding strip (2) protrudes from the first surface (31) of the base plate (3), and an inner one of the two snapping blocks (4) provided on the top end (22) of each flexible binding strip (2) is embedded in the second surface (32) of the base plate (3).

10. The binding structure for the loose-leaf notebook as claimed in claim 9, wherein the second surface (32) of the base plate (3) defines a plurality of recessed grooves (7) respectively facing the plurality of snapping holes (1), and the inner one of the two snapping blocks (4) provided on the top end (22) of each flexible binding strip (2) is embedded in a corresponding one of the plurality of recessed grooves (7).

11. The binding structure for a loose-leaf notebook as claimed in claim 5, wherein the second surface (32) of the base plate (3) forms a beveled surface (5).

12. A loose-leaf notebook, comprising: a plurality of loose-leaf papers (8) and a binding structure; wherein the binding structure is a single-piece structure, and the binding structure comprises:

a base plate (3) comprising a first surface (31) and a second surface (32) opposite to the first surface (32);

a plurality of snapping holes (1), arranged along a length of the base plate (3) and penetrating through the first surface (31) and the second surface (32); and a plurality of binding strips (2), arranged along the length of the base plate (3) and corresponding to the plurality of snapping holes (1) one by one; wherein each binding strip (2) comprises a bottom end (21) and a top end (22) opposite to each other, the bottom end (21) of each binding strip (2) is disposed on the first surface (31) of the base plate (3);

wherein after each binding strip (2) bends along a direction facing away from the corresponding snapping hole (1) and passes through the plurality of loose-leaf papers (8), the top end (22) of each binding strip (2) is snapped into the corresponding snapping hole (1) along a direction from the second surface (32) towards the first surface (31) to form a snap fit with the base plate (3); and after forming the snap fit, the top end (22) and the bottom end (21) of each binding strip (2) are spaced from each other in a width of the base plate (3);

wherein the top end (22) of each binding strip (2) is provided with two snapping blocks (4); the two snapping blocks (4) provided on the top end (22) of each binding strip (2) are arranged along a length of the binding strip (2) and spaced from each other; after forming the snap fit, the two snapping blocks (4) provided on each binding strip (2) are disposed on two sides of the base plate (3) along a thickness of the base plate (3), respectively, and an outer one of the two snapping blocks (4) provided on each binding strip (2) protrudes from the first surface (31) of the base plate (3), and an inner one of the two snapping blocks (4) provided on each binding strip (2) is embedded in the second surface (32) of the base plate (3).

13. The loose-leaf notebook as claimed in claim 12, wherein the base plate (3) and the plurality of binding strips (2) are made of silicone rubber.

14. The loose-leaf notebook as claimed in claim 12, wherein the top end (22) of each binding strip (2) is provided with a snapping block (4); and after forming the snap fit, the snapping block (4) provided on the top end (22) of each binding strip (2) protrudes from the first surface (31) of the base plate (3).

* * * * *